United States Patent
Onoda et al.

(10) Patent No.: US 6,617,789 B2
(45) Date of Patent: Sep. 9, 2003

(54) GLASS FOR COVERING ELECTRODES AND PLASMA DISPLAY PANEL

(75) Inventors: Hitoshi Onoda, Kanagawa (JP); Yumiko Aoki, Kanagawa (JP); Tsuneo Manabe, Kanagawa (JP); Satoshi Fujimine, Kanagawa (JP); Michifumi Kawai, Kanagawa (JP); Shoichi Iwanaga, Kanagawa (JP)

(73) Assignees: Asahi Glass Company, Limited, Tokyo (JP); Fujitsu Hitachi Plasma Display Limited, Kawasaki (JP)

( * ) Notice: Subject to any disclaimer, the term of this patent is extended or adjusted under 35 U.S.C. 154(b) by 0 days.

(21) Appl. No.: 09/971,618

(22) Filed: Oct. 9, 2001

(65) Prior Publication Data

US 2002/0079840 A1 Jun. 27, 2002

(30) Foreign Application Priority Data

Nov. 1, 2000 (JP) .............................. 2000-334409

(51) Int. Cl.⁷ .......................... H01J 11/02; B32B 17/00
(52) U.S. Cl. ................ 313/586; 313/493; 313/636; 428/426; 428/446; 501/32; 501/64; 501/72; 501/74; 501/154; 501/55; 501/59; 501/69; 501/60; 501/62
(58) Field of Search ................ 313/584, 585, 313/586, 493, 587, 636; 428/426–429, 446–447; 501/22, 26, 48, 50, 54, 55, 59, 64, 69, 60, 62, 32, 68, 72, 74, 76, 78, 154

(56) References Cited

U.S. PATENT DOCUMENTS 5,948,537 A  9/1999  Onoda et al.

6,296,539 B1 * 10/2001  Awaji et al. .................. 445/24
6,337,538 B1 *  1/2002  Awaji et al. .................. 313/586

FOREIGN PATENT DOCUMENTS

| JP | 10067534   | * | 3/1998  | ............ C03C/3/72 |
| JP | 10-241571  |   | 9/1998  |                        |
| JP | 10-316451  |   | 12/1998 |                        |
| JP | 11343138   | * | 12/1999 | ............ C03C/3/74 |
| JP | 2000-11900 |   | 1/2000  |                        |
| JP | 2000016833 | * | 1/2000  | ............ C03B/27/12|
| JP | 2000-195335|   | 7/2000  |                        |

OTHER PUBLICATIONS

Derwent Publications, AN 1990–177328, SU 1 502 496, Aug. 23, 1989.

* cited by examiner

Primary Examiner—Ashok Patel

(57) ABSTRACT

A glass for covering electrodes, which consists, as represented by mass percentage based on the following oxides, essentially of:

Figure 1:
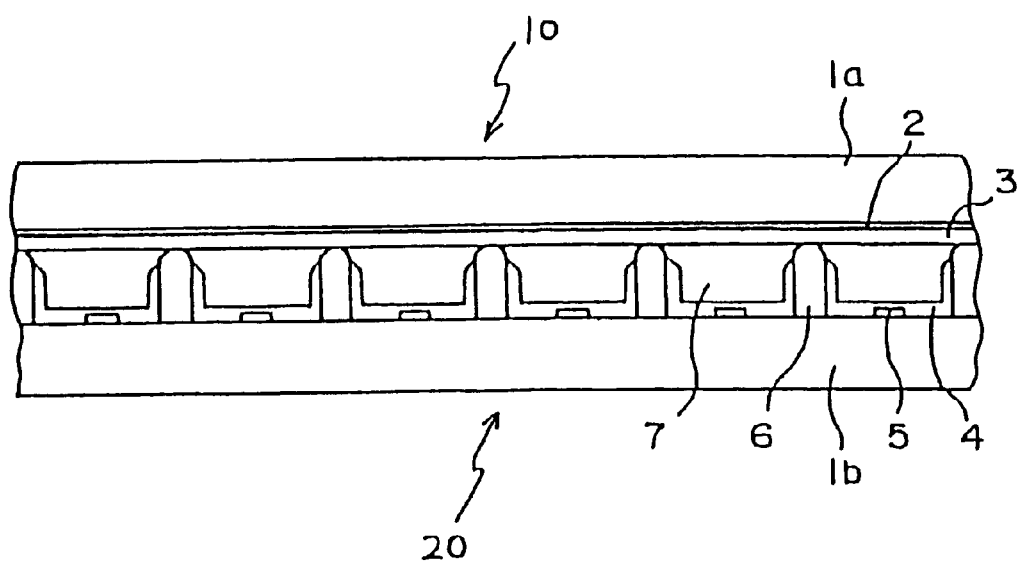

|        | Mass percentage |
|--------|-----------------|
| PbO    | 44 to 68%       |
| $Bi_2O_3$ | 0 to 18%,    |
| $B_2O_3$  | 19 to 23%,   |
| $SiO_2$   | 1.2 to 5%,   |
| $Al_2O_3$ | 2 to 6%,     |
| ZnO    | 4 to 9%,        |
| CuO    | 0.1 to 0.5%,    |
| $In_2O_3$ | 1.1 to 2%,   |
| $SnO_2$   | 0 to 1%, and |
| CeO2   | 0 to 1%.        |

11 Claims, 1 Drawing Sheet

GLASS FOR COVERING ELECTRODES AND PLASMA DISPLAY PANEL

The present invention relates to a glass suitable for covering for insulation of electrodes, particularly transparent electrodes of e.g. ITO (indium oxide doped with tin) or tin oxide, and a plasma display panel.

In recent years, a thin flat plate type color display device has attracted an attention. In such a display device, it is necessary to form an electrode for each pixel in order to control the display state in the pixel for forming an image. In order to prevent deterioration of the image quality, transparent electrodes are used as such electrodes. As the transparent electrodes, thin films of ITO or tin oxide formed on a glass substrate, are commonly employed. Here, the tin oxide includes tin oxide doped with e.g. fluorine or antimony.

Transparent electrodes which are formed on the surface of a glass substrate to be used as a display panel of the above display device, are formed into fine lines to realize fine images. In order to control the respective pixels independently, it is necessary to secure insulation among such finely formed transparent electrodes. However, if moisture is present on the surface of the glass substrate, or if an alkali component is present in the glass substrate, it may happen that an electrical current flows to some extent via the surface of this glass substrate. To prevent such a current, it is effective to form an insulating layer between the transparent electrodes. Further, in order to prevent deterioration of the image quality by the insulating layer formed between the transparent electrodes, such an insulating layer is preferably transparent. Various materials are known as an insulating material for forming such an insulating layer. Among them, a glass material is widely employed which is a transparent and highly reliable insulating material.

In a plasma display panel (hereinafter referred to as PDP) which is recently expected as a large size flat color display device, cells are defined and formed by a front substrate used as a display surface, a rear substrate and barrier ribs, and an image will be formed by generating plasma discharge in the cells. Transparent electrodes are formed on the surface of the front substrate, and it is essential to cover the transparent electrodes with a glass in order to protect the transparent electrodes from plasma.

Such a glass to be used for covering electrodes, is employed usually in the form of a glass powder. For example, to such a glass powder, a filler, etc. may be added as the case requires, and then the mixture is formed into a paste. A glass paste thus obtained is coated on a glass substrate having transparent electrodes preliminarily formed, followed by firing to cover the transparent electrodes.

Further, in the front substrate of PDP, if the electrical resistance is too high solely with transparent electrodes made of e.g. ITO or tin oxide, a metal layer of Ag or Al, or of a three layer structure of Cr—Cu—Cr (hereinafter, such a metal layer will be referred to as a metal electrode) may sometimes be formed on such transparent electrodes. In such a case, the glass paste is coated also on the metal electrodes, followed by firing.

Such a glass for covering electrodes, is required to have an electrical insulating property, and it is further required that the reactivity with electrodes (such as transparent electrodes or metal electrodes) or with a glass substrate is small, and transparency of the glass layer covering the electrodes, obtainable by firing, is high. Various glasses have been proposed. For example, JP-A-10-316451 discloses a glass for covering electrodes, having $In_2O_3$ added thereto in order to suppress reaction of transparent electrodes made of ITO with a glass layer covering the electrodes. The glass for covering electrodes in Examples 1 to 11 of the publication has a composition, as represented by mass percentage, of PbO: 36.0 to 59.5%, $B_2O_3$: 17.0 to 25.0%, $SiO_2$: 2.5 to 4.0%, $Al_2O_3$: 0 to 2.5%, ZnO: 9.5 to 18.5%, $In_2O_3$: 0 to 3.0, $SnO_2$: 0 to 1.5%, CaO: 0 to 5.0%, SrO: 0 to 9.0% and BaO: 0 to 16.5%.

However, in recent years, requirements with regard to reactivity with e.g. electrodes or a glass substrate, and transparency of the glass layer covering electrodes, have become stricter, and it has been difficult to simultaneously satisfy such requirements with regard to reactivity and transparency with a conventional glass for covering electrodes. It is an object of the present invention to provide a glass for covering electrodes which satisfies these requirements simultaneously and a plasma display panel.

The present invention provides a glass for covering electrodes, which consists, as represented by mass percentage based on the following oxides, essentially of:

|  | Mass percentage |
|---|---|
| PbO | 44 to 68% |
| $Bi_2O_3$ | 0 to 18%, |
| $B_2O_3$ | 19 to 23%, |
| $SiO_2$ | 1.2 to 5%, |
| $Al_2O_3$ | 2 to 6%, |
| ZnO | 4 to 9%, |
| CuO | 0.1 to 0.5%, |
| $In_2O_3$ | 1.1 to 2%, |
| $SnO_2$ | 0 to 1%, and |
| $CeO_2$ | 0 to 1% |

(hereinafter this glass will be referred to as the glass of the present invention as represented by mass percentage).

The present invention further provides a glass for covering electrodes, which consists, as represented by mol % based on the following oxides, essentially of:

|  | mol % |
|---|---|
| PbO | 25 to 41% |
| $Bi_2O_3$ | 0 to 5%, |
| $B_2O_3$ | 35 to 42%, |
| $SiO_2$ | 2.6 to 10%, |
| $Al_2O_3$ | 2.6 to 6.5%, |
| ZnO | 7 to 15%, |
| CuO | 0.2 to 0.8%, |
| $In_2O_3$ | 0.5 to 1%, |
| $SnO_2$ | 0 to 1%, and |
| $CeO_2$ | 0 to 1% |

(hereinafter this glass will be referred to as the glass of the present invention as represented by mol %).

The present invention still further provides a PDP having a front substrate, wherein transparent electrodes formed on a glass substrate constituting the front substrate are covered by the above-described glass for covering electrodes.

Now, the present invention will be described in detail with reference to the preferred Embodiments.

In the accompanying drawing:

FIG. 1 is a cross-sectional view illustrating PDP of the present invention.

The glass of the present invention as represented by mass percentage and the glass of the present invention as represented by mol % will be referred to simply as the glass of the present invention. The glass of the present invention is used usually in the form of a powder. The powder of the glass the present invention is formed into a glass paste using an organic vehicle to impart printability, and such a paste is coated on electrodes formed on a glass substrate, followed by firing to cover the electrodes. Here, the organic vehicle is one having a binder such as ethylcellulose dissolved in an organic solvent such as α-terpineol. In PDP, the glass of the present invention is preferably used for covering transparent electrodes formed on a front substrate, and the firing temperature is typically 580° C.

The powder of the glass of the present invention is not only used as the glass paste, but also used as a green sheet. In this case, the powder of the glass of the present invention is kneaded with a resin, and the obtained kneaded product is coated on a support film such as a polyethylene film to obtain a green sheet, and the green sheet is transferred to electrodes formed on a glass substrate, followed by firing to cover the electrodes.

The average particle size of the above powder is preferably at least 0.5 μm. If it is less than 0.5 μm, bubbles in the glass layer covering electrodes, obtained by firing, tend to be many, whereby the transparency tends to decrease, or the time required for powdering tends to remarkably increase. More preferably, it is at least 0.7 μm. Further, the average particle size is preferably at most 3 μm.

Further, the maximum particle size of the above powder is preferably at most 35 μm. The thickness of the glass layer covering electrodes in PDP is usually at most 40 μm, but if the maximum particle size exceeds 35 μm, irregularities are likely to form on a surface of the glass layer covering electrodes, whereby an image of PDP is likely to deform. The maximum particle size is more preferably at most 20 μm.

Preferably, the glass of the present invention is one having no crystal deposited on its surface after its powder subjected to pressure molding is held at 580° C. for 5 hours. If the glass has crystals deposited on its surface, transparency of the glass layer covering electrodes may decrease. Here, whether or not the crystals are deposited is examined by means of an optical microscope.

The glass transition point $T_G$ of the glass of the present invention is preferably at least 400° C. If it is less than 400° C., there is a fear that cracks may form on a magnesium oxide layer in a step of sealing the front substrate and the rear substrate which are disposed to face each other of PDP. It is more preferably at least 405° C. Here, the temperature in the above step is typically 410° C., and the above magnesium oxide layer is formed on the glass layer covering electrodes.

The softening point Ts of the glass of the present invention is preferably at most 500° C. If it exceeds 500° C., there is a fear that the glass may not adequately flow during firing, or bubbles generated during firing are less likely to rise to the surface to disappear. It is more preferably at most 495° C., particularly preferably at most 490° C.

Further, it is preferred that TG is at least 400° C. and Ts is at most 500° C.

The average linear expansion coefficient α in a range of from 50 to 350°C. of the glass of the present invention is preferably within a range of from $75 \times 10^{-7}$ to $85 \times 10^{-7}$/° C. Out of this range, it tends to be difficult to match the expansion characteristic with a conventional glass substrate having an average linear expansion coefficient of from $80 \times 10^{-7}$ to $90 \times 10^{-7}$/° C. More preferably, a is at least $77 \times 10^{-7}$/° C. and at most $83 \times 10^{-7}$/° C.

Now, the glass of the present invention as represented by mass percentage and the glass of the present invention as represented by mol % will be explained together, as represented by mass percentage and mol %, respectively. The contents as represented by mol % with regard to explanation of the glass of the present invention as represented by mol % are shown in brackets [••%].

Pbo is essential as it is effective for lowering $T_s$. If it is less than 44% [25%], such an effect tends to be small. It is preferably at least 53%. If it exceeds 68% [41%], $T_G$ tends to decrease, the glass is likely to react with transparent electrodes or a tends to be high. It is preferably at most 65% [39%], particularly preferably at most 64% [38%].

$Bi_2O_3$ is not essential, but may be incorporated up to 18% [5%] in order to lower $T_s$. If it exceeds 18% [5%], the glass is likely to be colored yellow, or the relative dielectric constant tends to be too high. It is preferably at most 9% [3%]. In a case where $Bi_2O_3$ is incorporated, its content is preferably at least 1%. Further, the total content of PbO and $Bi_2O_3$ is preferably at least 60% [33%]. If it is less than 60% [33%], $T_s$ tends to be lowered. It is more preferably at least 62% [34%].

In a case where substantially no $Bi_2O_3$ is incorporated, that is, in a case where its content is at most an impurity level, the content of PbO is more preferably at least 62% [35%], particularly preferably at least 63% [37%]. The above $Bi_2O_3$ content at an impurity level is typically at most 0.5% [0.2%], more typically at most 0.1% [0.05%].

$B_2O_3$ is essential as it is effective for stabilizing the glass. If it is less than 19% [35%], such an effect tends to be small, and for example, increase in $SiO_2$ is required for its compensation, and increase in PbO is required in order to suppress the resulting increase of $T_S$, and accordingly, the glass is likely to react with transparent electrodes, or a tends to be high. Further, if it is less than 19% [35%], α tends to be high. It is preferably at least 20% [37%]. If it exceeds 23% [42%], $T_S$ tends to be high, or crystals are likely to deposit during firing. It is preferably at most 22% [41%].

$SiO_2$ is essential as it is effective for stabilizing the glass. If it is less than 1.2% [2.6%], such an effect tends to be small, and for example, there is a fear that $B_2O_3$ has to be incorporated in an amount exceeding 23% [42%] for its compensation. It is preferably at least 1.5% [3%], more preferably at least 2% [4%]. If it exceeds 5% [10%], $T_S$ tends to be high, or increase in PbO is required in order to suppress increase of $T_S$, and accordingly, the glass is likely to react with transparent electrodes, or α tends to be high. It is preferably at most 4% [8%], more preferably at most 3% [6%].

$Al_2O_3$ is essential as it is effective for stabilizing the glass and suppressing the reaction with transparent electrodes by coexistence with $In_2O_3$. If it is less than 2% [2.6%], such an effect tends to be small, and the phenomenon as described in the case where the $B_2O_3$ content is less than 19% [35%] may, for example, occur. It is preferably at least 2.1% [2.1%], more preferably at least 3% [3%]. If it exceeds 6% [6.5%], $T_S$ tends to be high, or increase in Pbo may be required in order to suppress increase of $T_S$, and accordingly, the glass is likely to react with transparent electrodes, or α tends to be high. It is preferably at most 5% [6%], more preferably at most 4.5% [5.5%].

ZnO is essential as it is effective for suppressing the reaction with transparent electrodes or lowering α. If it is less than 4% [7%], such an effect tends to be small. It is preferably at least 6.5% [10%]. If it exceeds 9% [15%], Ts tends to be high, or crystals are likely to deposit during firing. It is preferably at most 8% [14%].

CuO is essential as it is effective for accelerating removal of bubbles generated during firing. If it is less than 0.1%

[0.2%], such an effect tends to be small. It is preferably at least 0.2% [0.3%]. If it exceeds 0.5% [0.8%], coloring tends to be remarkable, or decrease of transparency due to the coloring tends to be remarkable. It is preferably at most 0.4% [0.7%].

$In_2O_3$ is essential as it is effective for suppressing the reaction with transparent electrodes. If it is less than 1.1% [0.5%], such an effect tends to be small. It is preferably at least 1.2% [0.6%], more preferably at least 1.4% [0.7%]. If it exceeds 2% [1%], bubbles generated during firing are less likely to rise to the surface to disappear. It is preferably at most 1.8% [0.9%], more preferably at most 1.7% [0.8%].

$SnO_2$ is not essential, but may be incorporated up to 1% [1%] in order to suppress coloring due to carbon-containing impurities contained in e.g. the organic vehicle. If it exceeds 1%, bubbles generated during firing are less likely to rise to the surface to disappear. It is preferably at most 0.8% [0.8%], more preferably at most 0.6% [0.6%]. In a case where $SnO_2$ is incorporated, its content is preferably at least 0.2% [0.2%], more preferably at least 0.4% [0.4%].

$CeO_2$ is not essential, but may be incorporated up to 1% [1%] in order to suppress coloring due to carbon-containing impurities contained in e.g. the organic vehicle. If it exceeds 1%, yellowing tends to be remarkable. It is preferably at most 0.8% [0.8%], more preferably at most 0.6% [0.6%]. In a case where coloring has to be further suppressed, substantially no $CeO_2$ is preferably incorporated, for example, it is at most 0.1% [0.1%].

Here, in a case where $SnO_2$ and $CeO_2$ are incorporated, the total content of $SnO_2$ and $CeO_2$ is preferably at most 1% [1%]

In a case where substantially no $Bi_2O_3$ is incorporated, preferably, PbO is from 62 to 65% [from 35 to 39%], $SiO_2$ is from 1.5 to 3% [from 3 to 6%], $Al_2O_3$ is from 3 to 4.5% [from 3 to 5.5%], ZnO is from 6.5 to 8% [from 10 to 14%], and $SnO_2+CeO_2$ is from 0 to 1% [from 0 to 1%].

The glass of the present invention consists essentially of the above components. However, other components may be incorporated within a range not to impair the purpose of the present invention. Then, the total content of the above "other components" is preferably at most 20% [20%], more preferably at most 10% [10%].

The above "other components" may, for example, be MgO, CaO, SrO, BaO, $TiO_2$, $ZrO_2$, $La_2O_3$, $Li_2O$, $Na_2O$, $K_2O$ and F.

Each of MgO, CaO, SrO and BaO is a component to increase α and for other purposes, and their contents are preferably at most 2% [5%], at most 3% [5%], at most 4% [5%] and at most 6% [5%], respectively.

Each of $TiO_2$, $ZrO_2$ and $La_2O_3$ is a component for increasing water resistance and for other purposes, and their contents are preferably at most 2% [3%], at most 3% [3%] and at most 5% [2%], respectively. An alkali metal oxide such as $Li_2O$, $Na_2O$ or $K_2O$ or a halogen such as F is a component to decrease $T_S$, but there is a fear that they may decrease the insulating properties of the glass, and accordingly the total content of alkali metal oxides is preferably at most 4% [5%], and the total content of halogens is preferably at most 1% [2%].

In the front substrate of PDP of the present invention, transparent electrodes are formed on a glass substrate, and the surface of the glass substrate having such transparent electrodes formed thereon, is covered with the glass of the present invention.

The thickness of the glass substrate to be used for the front substrate is usually 2.8 mm, and the visible light transmittance of this glass substrate itself using illuminant C (hereinafter referred to simply as visible light transmittance) is typically 92%.

Further, the transparent electrodes are, for example, strips with a width of 0.5 mm, and the respective strip electrodes are formed to be in parallel with one another. The distance between the center lines of the respective strip electrodes is, for example, from 0.83 to 1.0 mm.

For the front substrate of PDP of the present invention, the visible light transmittance is preferably at least 80%. If it is less than 80%, the image quality of PDP tends to be low. It is more preferably at least 82%.

PDP of the present invention can be produced as follows, for example, when it is of an alternating current system.

As shown in FIG. 1, patterned transparent electrodes 2 and bus bars (not shown) are formed on the surface of a glass substrate 1a. Then, a powder of the glass of the present invention is coated and fired to form a glass layer 3. Finally, a magnesium oxide layer (not shown) is formed as a protecting layer, to obtain a front substrate 10. On the other hand, on a glass substrate 1b, patterned electrodes 5 for address are formed. Then, barrier ribs 6 are formed in a stripe shape, and phosphor layers 4 are further printed and fired, to obtain a rear substrate 20.

Along the periphery of the front substrate 10 and the rear substrate 20, a sealing material (not shown) is coated by a dispenser, and the front and rear substrates are assembled so that the transparent electrodes 2 face the electrodes 5 for address, followed by firing to obtain PDP. Then, the interior of PDP is evacuated, and a discharge gas such as Ne or He-Xe is sealed in discharge space 7.

The above example is of an alternating current system. However, the present invention is applicable also to PDP of a direct current system.

Now, the present invention will be described in further detail with reference to Examples. However, it should be understood that the present invention is by no means restricted to such specific Examples.

EXAMPLES

Starting materials were mixed so that the composition would be as shown in Table 1 or 2 by mass percentage in lines for from PbO to $SnO_2$. Then, this mixture was melted for 1 hour by means of a platinum crucible in an electric furnace of from 1,000 to 1,300° C. and formed into a thin sheet glass. This thin sheet glass was pulverized by a ball mill to obtain a glass powder (average particle size: 1 μm, maximum particle size: at most 13 μm).

Example 1 to 6 represent Examples of the present invention, and Examples 7 to 13 represent Comparative Examples, and among them, Examples 12 and 13 represent glasses as disclosed in Examples 2 and 3 in Table 1 of JP-A-10-316451. Further, compositions as represented by mol % are shown in Tables 3 and 4.

With respect to each glass powder, $T_G$ (unit: ° C.), $T_S$ (unit: ° C.) and a (unit: $10^{-7}/°$ C.) were measured. The results are shown in Tables 1 and 2. Here, in Examples 12 and 13, $T_G$ and $T_S$ alone were measured. Further, in Examples 1 to 11, no deposition of crystals was confirmed by the method as described above (no examination was carried out in Examples 12 and 13).

100 g of such a glass powder was kneaded with 25 g of an organic vehicle to obtain a glass paste. The organic vehicle is one having ethylcellulose dissolved in an amount of 10% by mass percentage to α-terpineol or diethylene glycol monobutyl ether monoacetate.

Then, a glass substrate having a size of 50 mm×75 mm and a thickness of 2.8 mm was prepared. The glass substrate is made of a glass A having a composition, as represented by mass percentage, Of $SiO_2$: 58%, $Al_2O_3$: 7%, MgO: 2%, CaO: 5%, SrO: 7%, BaO: 8%, $ZrO_2$: 3%, $Na_2O$: 4% and $K_2O$: 6% (average linear expansion coefficient in a range of from 50 to 350° C.: 87×$10^{-7}$/° C.), and stripe ITO transparent electrodes are formed thereon, and a Cr—Cu—Cr layer (metal electrode) is formed on a part of the ITO transparent electrodes.

The glass paste was uniformly screen-printed on the entire surface of the glass substrate on which the ITO transparent electrodes were formed, followed by drying at 120° C. for 10 minutes. The glass substrate was heated to 580° C. at a temperature rising rate of 10° C./min and further maintained at that temperature for 15 minutes for firing. The thickness of the glass layer covering the transparent electrodes was 30 μm.

Of the glass substrate after the firing, a portion on which no ITO transparent electrodes were formed thereon, an ITO transparent electrodes portion on which no metal electrode was formed thereon, and a metal electrode periphery portion, were observed by means of an optical microscope, and the state of bubbles remaining in the glass layer covering electrodes was observed. The results are shown in Tables 1 and 2 in lines "on glass substrate", "on transparent electrodes" and "metal electrode periphery", respectively. o represents no or a few bubbles remaining, X represents many bubbles remaining and Δ represents the middle thereof. As the evaluation results, o or Δ is preferred and o is more preferred.

Further, the corrosion state of the ITO transparent electrodes due to the glass layer covering electrodes was observed by means of an optical microscope. The results are shown in Tables 1 and 2 in lines "transparent electrode corrosion". o represents no or slight corrosion observed, X represents remarkable corrosion observed and Δ represents the middle thereof. As the evaluation results, o or Δ is preferred and o is more preferred.

Then, a glass substrate made of the above glass A having a size of 50 mm×50 mm and a thickness of 2.8 mm, and having ITO transparent electrodes entirely formed thereon, was prepared, and a glass layer covering electrodes having a thickness of 30 μm was entirely formed on the portion of 45 mm×50 mm in the same manner as described above. Here, portions having no glass layer covering electrodes formed thereon were two portions with a width of 2.5 mm on both ends of the glass substrate. A voltage was applied to these portions on both ends having no glass layer covering electrodes formed thereon, to measure the electric resistance (unit: Ω/cm²). The distance between portions to which the voltage was applied was 48 mm. The results are shown in Tables 1 and 2. The electric resistance is preferably at most 250 Ω/cm². It is more preferably at most 200 Ω/cm², particularly preferably at most 150 Ω/cm²₂, most preferably at most 100 Ω/cm².

Further, the visible light transmittance (unit: %) of the above "glass substrate having the glass layer covering electrodes entirely formed thereon" was measured. The results are shown in Tables 1 and 2. It is preferably at least 80%. No measurement was carried out in Examples 5, 8, 9 and 10.

TABLE 1

| Examples | 1 | 2 | 3 | 4 | 5 | 6 | 7 |
|---|---|---|---|---|---|---|---|
| PbO | 63.4 | 63.0 | 63.8 | 63.8 | 65.0 | 64.5 | 61.6 |
| $B_2O_3$ | 20.8 | 20.7 | 20.9 | 21 | 20.3 | 21.1 | 22.9 |
| $SiO_2$ | 2.3 | 2.2 | 2.3 | 2.3 | 2.2 | 2.2 | 0 |
| $Al_2O_3$ | 3.8 | 3.8 | 3.8 | 3.8 | 3.7 | 3.8 | 3.9 |
| ZnO | 7.3 | 7.9 | 7.3 | 6.7 | 5.9 | 6.0 | 9.2 |
| CuO | 0.3 | 0.3 | 0.3 | 0.3 | 0.29 | 0.29 | 0.3 |
| $In_2O_3$ | 1.6 | 1.6 | 1.6 | 1.6 | 2.0 | 1.5 | 1.6 |
| $SnO_2$ | 0.56 | 0.56 | 0 | 0.57 | 0.55 | 0.56 | 0.57 |
| $T_G$ | 410 | 412 | 412 | 408 | 405 | 410 | 412 |
| $T_S$ | 487 | 484 | 480 | 482 | 482 | 477 | 492 |
| α | 79 | 79 | 80 | 80 | 84 | 78 | 78 |

TABLE 1-continued

| Examples | 1 | 2 | 3 | 4 | 5 | 6 | 7 |
|---|---|---|---|---|---|---|---|
| On glass substrate | o | o | o | Δ | Δ | Δ | × |
| On transparent electrodes | o | o | o | Δ | o | o | Δ |
| Metal electrode periphery | o | o | o | o | o | o | o |
| Transparent electrode corrosion | o | o | o | o | Δ | Δ | Δ |
| Electric resistance | 85 | 95 | 100 | 150 | 110 | 220 | 90 |
| Visible light transmittance | 83 | 83 | 83 | 83 | — | 83 | 81 |

TABLE 2

| Examples | 8 | 9 | 10 | 11 | 12 | 13 |
|---|---|---|---|---|---|---|
| PbO | 65.5 | 64.0 | 65.7 | 65.4 | 54.5 | 59.5 |
| $B_2O_3$ | 20.4 | 21 | 20.5 | 22.9 | 21.5 | 19.5 |
| $SiO_2$ | 3.3 | 2.3 | 2.2 | 1.1 | 3.5 | 2.5 |
| $Al_2O_3$ | 1.9 | 3.8 | 3.8 | 3.7 | 0 | 2.5 |
| ZnO | 6.0 | 7.4 | 6.0 | 4.5 | 14 | 9.5 |
| BaO | 0 | 0 | 0 | 0 | 4.5 | 2.5 |
| CuO | 0.29 | 0 | 0.29 | 0.29 | 0 | 0 |
| $In_2O_3$ | 2.0 | 1.5 | 1.0 | 1.5 | 2 | 3 |
| $SnO_2$ | 0.55 | 0 | 0.55 | 0.55 | 0 | 1 |
| $T_G$ | 405 | 407 | 400 | 412 | 425 | 420 |
| $T_S$ | 470 | 483 | 470 | 474 | 500 | 490 |
| α | 83 | 87 | 82 | 81 | — | — |
| On glass substrate | Δ | × | o | o | — | — |
| On transparent electrodes | Δ | × | o | Δ | — | — |
| Metal electrode periphery | o | × | o | × | — | — |
| Transparent electrode corrosion | Δ | Δ | × | × | — | — |
| Electric resistance | 530 | 30 | 580 | 520 | — | — |
| Visible light transmittance | — | — | — | 84 | 63 | 42 |

TABLE 3

| Examples | 1 | 2 | 3 | 4 | 5 | 6 | 7 |
|---|---|---|---|---|---|---|---|
| PbO | 37.3 | 37.0 | 37.6 | 37.7 | 39.2 | 38.4 | 35.8 |
| $B_2O_3$ | 39.3 | 38.9 | 39.5 | 39.8 | 39.3 | 40.3 | 42.8 |
| $SiO_2$ | 5.0 | 4.8 | 5.0 | 5.1 | 4.9 | 4.9 | 0 |
| $Al_2O_3$ | 4.9 | 4.8 | 4.9 | 4.9 | 4.9 | 4.9 | 5.0 |
| ZnO | 11.8 | 12.7 | 11.8 | 10.9 | 9.8 | 9.8 | 14.7 |
| CuO | 0.50 | 0.49 | 0.50 | 0.50 | 0.49 | 0.48 | 0.49 |
| $In_2O_3$ | 0.76 | 0.75 | 0.76 | 0.76 | 0.97 | 0.72 | 0.75 |
| $SnO_2$ | 0.49 | 0.49 | 0 | 0.40 | 0.49 | 0.49 | 0.49 |

TABLE 4

| Examples | 8 | 9 | 10 | 11 | 12 | 13 |
|---|---|---|---|---|---|---|
| PbO | 39.2 | 37.7 | 39.4 | 39.4 | 29.8 | 34.9 |
| $B_2O_3$ | 39.2 | 39.7 | 39.4 | 44.2 | 37.7 | 36.7 |
| $SiO_2$ | 7.3 | 5.0 | 4.9 | 2.5 | 7.1 | 5.4 |
| $Al_2O_3$ | 2.5 | 4.9 | 5.0 | 4.9 | 0 | 3.2 |
| ZnO | 9.9 | 12.0 | 9.9 | 7.4 | 21 | 15.3 |
| BaO | 0 | 0 | 0 | 0 | 3.6 | 2.1 |
| CuO | 0.49 | 0 | 0.49 | 0.49 | 0 | 0 |
| $In_2O_3$ | 0.96 | 0.71 | 0.48 | 0.73 | 0.88 | 1.4 |
| $SnO_2$ | 0.49 | 0 | 0.49 | 0.40 | 0 | 0.87 |

The above visible light transmittance was measured with respect to the case where firing was carried out by maintaining the glass substrate at 580° C. for 15 minutes, and in Examples 1, 12 and 13, the visible light transmittance was measured also with respect to a case where firing was carried out by maintaining the glass substrate at 580° C. for 30 minutes, at 590° C. for 15 minutes or 30 minutes.

The visible light transmittance was measured with respect to the glass substrate having the ITO transparent electrodes entirely formed thereon (one having transparent electrodes as an under layer of the glass layer covering electrodes), but the visible light transmittance was measured similarly with respect to a glass substrate having the glass layer covering electrodes directly entirely formed thereon (one not having transparent electrodes as an under layer of the glass layer covering electrodes). Namely, a glass substrate made of the above glass A having a size of 50 mm×50 mm and a thickness of 2.8 mm was prepared, and a glass layer covering electrodes having a thickness of 30 μm was entirely formed on a portion of 45 mm×50 mm in the same manner as described above, and the visible light transmittance was measured. Firing was carried out by maintaining the glass substrate at 580° C. or 590° C. for 15 minutes or 30 minutes.

The measurement results of the visible light transmittance (unit: %) are shown in Table 5.

When one having the transparent electrodes as an under layer and one not having transparent electrodes as an under layer are compared under the same firing conditions, the visible light transmittance of the former is smaller than the visible light transmittance of the latter. This is considered to be because reaction of the glass layer covering electrodes with the transparent electrodes took place in the former. The difference in the visible light transmittance between one having the transparent electrodes as an under layer and one not having transparent electrodes as an under layer is from 1 to 7% in Example 1 which is Example of the present invention and in Example 13 which is a Comparative Example, whereas it is from 8 to 15% in Example 12 which is a Comparative Example. Accordingly, it is considered that reaction of the glass layer covering electrodes with the transparent electrodes remarkably takes place in Example 12 as compared with Examples 1 and 13.

Further, the visible light transmittance of one having the transparent electrodes as an under layer is from 82 to 83%, i.e. at least 80% in Example 1, whereas it is from 63 to 70% in Example 12 and it is from 42 to 49% in Example 13, and it is less than 80% in either Example. The low visible light transmittance in Example 12 is considered to be mainly due to the reaction of the glass layer covering electrodes with the transparent electrodes. The low visible light transmittance in Example 13 is considered to be due to inadequate removal of bubbles during firing in the glass layer covering electrodes, rather than the above reaction.

As mentioned above, it is considered that in Example 1 which represents the glass of the present invention, the reaction of the glass layer covering electrodes with the transparent electrodes is small, and bubbles are adequately removed during firing, and accordingly, the transparency of the glass layer covering electrodes is excellent.

TABLE 5

| Under layer | Firing temperature (° C.) | Time (minutes) | Ex. 1 | Ex. 12 | Ex. 13 |
|---|---|---|---|---|---|
| Transparent electrodes | 580 | 15 | 83 | 63 | 42 |
| Transparent electrodes | 580 | 30 | 83 | 66 | 49 |
| Transparent electrodes | 590 | 15 | 82 | 68 | 43 |
| Transparent electrodes | 590 | 30 | 83 | 70 | 49 |
| Glass substrate | 580 | 15 | 84 | 71 | 45 |
| Glass substrate | 580 | 30 | 90 | 78 | 50 |
| Glass substrate | 590 | 15 | 84 | 83 | 50 |
| Glass substrate | 590 | 30 | 84 | 85 | 56 |

By using the glass of the present invention, the transparency of the glass layer covering transparent electrodes on a glass substrate can be made high, whereby an image quality of PDP can be improved, and further, reactivity with e.g. electrodes or a glass substrate can be suppressed, whereby increase in electric resistance of the transparent electrodes can be suppressed for example. Further, the amount of carbon-containing impurities remaining in the glass layer can be reduced, whereby deterioration in brightness in PDP can be reduced.

With PDP of the present invention, the transmittance of its front substrate is high, and the image quality is excellent.

The entire disclosure of Japanese Patent Application No. 2000-334409 filed on Nov. 1, 2000 including specification, claims, drawings and summary are incorporated herein by reference in its entirety.

What is claimed is:

1. A glass for covering electrodes, which consists, as represented by mass percentage based on the following oxides, essentially of:

|  | Mass percentage |
|---|---|
| PbO | 44 to 68% |
| $Bi_2O_3$ | 0 to 18%, |
| $B_2O_3$ | 19 to 23%, |
| $SiO_2$ | 1.2 to 5%, |
| $Al_2O_3$ | 2 to 6%, |
| ZnO | 4 to 9%, |
| CuO | 0.1 to 0.5%, |
| $In_2O_3$ | 1.1 to 2%, |
| $SnO_2$ | 0 to 1%, and |
| $CeO_2$ | 0 to 1%. |

2. The glass for covering electrodes according to claim 1, wherein PbO is from 62 to 65%, $SiO_2$ is from 1.5 to 3%, $Al_2O_3$ is from 3 to 4.5%, ZnO is from 6.5 to 8%, $SnO_2$+$CeO_2$ is from 0 to 1%, and substantially no $Bi_2O_3$ is contained.

3. The glass for covering electrodes according to claim 1, which has a glass transition point of at least 400° C. and a softening point of at most 500° C.

4. The glass for covering electrodes according to claim 1, which has an average linear expansion coefficient in a range of from 50 to 350° C. within a range of from $75\times10^{-7}$ to $85\times10^{-7}/°$ C.

5. A plasma display panel having a front substrate, wherein transparent electrodes formed on a glass substrate constituting the front substrate are covered by the glass for covering electrodes as defined in claim 1.

6. A method of making the glass of claim 1, the method comprising melting a mixture including, in mass percentage,

|  | mol % |
|---|---|
| PbO | 25 to 41%, |
| $Bi_2O_3$ | 0 to 5%, |
| $B_2O_3$ | 35 to 42%, |
| $SiO_2$ | 2.6 to 10%, |
| $Al_2O_3$ | 2.6 to 6.5%, |
| ZnO | 7 to 15%, |
| CuO | 0.2 to 0.8%, |
| $In_2O_3$ | 0.5 to 1%, |
| $SnO_2$ | 0 to 1%, and |
| $CeO_2$ | 0 to 1%. |

7. A glass for covering electrodes, which consists, as represented by mol % based on the following oxides, essentially of:

|  | mol % |
|---|---|
| PbO | 25 to 41% |
| $Bi_2O_3$ | 0 to 5%, |
| $B_2O_3$ | 35 to 42%, |
| $SiO_2$ | 2.6 to 10%, |
| $Al_2O_3$ | 2.6 to 6.5%, |
| ZnO | 7 to 15%, |
| CuO | 0.2 to 0.8%, |
| $In_2O_3$ | 0.5 to 1%, |
| $SnO_2$ | 0 to 1%, and |
| $CeO_2$ | 0 to 1% |

8. The glass for covering electrodes according to claim 7, which has a glass transition point of at least 400° C. and a softening point of at most 500° C.

9. The glass for covering electrodes according to claim 7, which has an average linear expansion coefficient in a range of from 50 to 350° C. within a range of from $75 \times 10^{-7}$ to $85 \times 10^{-7}$/° C.

10. A plasma display panel having a front substrate, wherein transparent electrodes formed on a glass substrate constituting the front substrate are covered by the glass for covering electrodes as defined in claim 3.

11. A method of making the glass of claim 7, the method comprising melting a mixture including, in mol %,

|  | mol % |
|---|---|
| PbO | 25 to 41% |
| $Bi_2O_3$ | 0 to 5%, |
| $B_2O_3$ | 35 to 42%, |
| $SiO_2$ | 2.6 to 10%, |
| $Al_2O_3$ | 2.6 to 6.5%, |
| ZnO | 7 to 15%, |
| CuO | 0.2 to 0.8%, |
| $In_2O_3$ | 0.5 to 1%, |
| $SnO_2$ | 0 to 1%, and |
| $CeO_2$ | 0 to 1% |

* * * * *